US009176498B2

(12) United States Patent
Baramov

(10) Patent No.: US 9,176,498 B2
(45) Date of Patent: Nov. 3, 2015

(54) CONTROL THAT ESTIMATES DELAYED MANIPULATED VARIABLES

(71) Applicant: Honeywell International Inc., Morristown, NJ (US)

(72) Inventor: Lubomir Baramov, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 489 days.

(21) Appl. No.: 13/624,430

(22) Filed: Sep. 21, 2012

(65) Prior Publication Data

US 2013/0079899 A1 Mar. 28, 2013

(30) Foreign Application Priority Data

Sep. 23, 2011 (EP) .................................... 11182649

(51) Int. Cl.
*G05B 13/02* (2006.01)
*G05B 21/02* (2006.01)

(52) U.S. Cl.
CPC ...... *G05B 21/02* (2013.01); *G05B 2219/33274* (2013.01); *G05B 2219/34413* (2013.01)

(58) Field of Classification Search
CPC ...................... G05B 21/02; G05B 2219/34413
USPC .............. 700/28, 30, 33, 37, 44, 51; 709/230, 709/238
See application file for complete search history.

(56) References Cited

U.S. PATENT DOCUMENTS 3,767,900 A * 10/1973 Chao et al. ...................... 700/31
5,043,963 A * 8/1991 Iwamoto .................... 369/30.91
5,166,873 A * 11/1992 Takatsu et al. .................. 700/31
5,220,265 A * 6/1993 Araki et al. ................... 318/610
5,568,378 A * 10/1996 Wojsznis ........................ 700/44
6,082,099 A * 7/2000 Yasui et al. ..................... 60/276
6,094,602 A * 7/2000 Schade, III ..................... 700/45
6,243,610 B1 * 6/2001 Iino et al. .......................... 700/1
6,308,106 B1 * 10/2001 Ameri et al. .................... 700/45
7,546,169 B2 * 6/2009 Kawakatsu et al. ............ 700/30
7,620,460 B2 * 11/2009 Blevins et al. ................. 700/29
7,945,339 B2 * 5/2011 Blevins et al. .................. 700/29
8,200,346 B2 * 6/2012 Thiele ............................ 700/44
8,825,185 B2 * 9/2014 Salsbury ......................... 700/55
8,897,125 B2 * 11/2014 Baramov ...................... 370/216
2003/0123581 A1 * 7/2003 Kim ............................. 375/345
2007/0021850 A1 * 1/2007 Wojsznis et al. ................ 700/42
2007/0112905 A1 * 5/2007 Blevins et al. ................ 708/833
2010/0008456 A1 * 1/2010 Rohatschek .................. 375/354

(Continued)

OTHER PUBLICATIONS

Joseph et al. "Time-stamped model predictive control: an algorithm for control of processes with random delays," Computers and Chemical Engineering 28 (2004).*

(Continued)

*Primary Examiner* — Darrin Dunn

(74) *Attorney, Agent, or Firm* — Schwegman Lundberg & Woessner, P.A.

(57) ABSTRACT

A device and method calculates and sends a manipulated variable via a network to control an actuator in a process. An indication identifying when the sent manipulated variable was applied by the actuator is received, and an applied actuator signal is estimated. Using a difference between the calculated manipulated variable and the estimated applied signal, a next calculated manipulated variable is corrected prior to sending the next calculated manipulated variable to the actuator.

17 Claims, 3 Drawing Sheets

(56) References Cited

U.S. PATENT DOCUMENTS

| | | | | |
|---|---|---|---|---|
| 2010/0045422 | A1* | 2/2010 | Teng et al. | 340/3.1 |
| 2010/0204808 | A1* | 8/2010 | Thiele | 700/30 |
| 2011/0106011 | A1* | 5/2011 | Cinar et al. | 604/151 |
| 2012/0170639 | A1* | 7/2012 | Salsbury | 375/233 |
| 2012/0221124 | A1* | 8/2012 | Thiele | 700/31 |
| 2013/0197705 | A1* | 8/2013 | Ray et al. | 700/295 |

OTHER PUBLICATIONS

Liu Predictive Controller Design of Networked Systems With Communication Delays and Data Loss, Jun. 2010.*

Koivo Measurement Delay Estimation for Kalman Filter in Networked Control Systems, Jul. 2008.*

"European Application Serial No. 11182649.1, Office mailed Jul. 4, 2013", 5 pgs.

"European Application Serial No. 11182649.1, Response filed Jan. 8, 2014 to Office mailed Jul. 4, 2013", 15 pgs.

"Australian Application Serial No. 2012216747, Examination Report No. 2 mailed Oct. 13, 2014", 3 pgs.

Baramov, L., et al., "Kalman Filter or Systems with Communication Delay", *Proceedings of the 1st IFAC Workshop on Estimation and Control of Networked Systems*, (*NecSys 09*), Venice, Italy, Sep. 24-26, 2009, (2009), 310-315.

Pachner, Daniel, et al., "An Approach to Out-of-Sequence Measurements in Feedback Control Systems", *IEEE International Workshop on Factory Communications Systems* (*WFCS 2008*), (2008), 7 pgs.

Pachner, Daniel, et al., "Suboptimal State Estimation under Communication Delays", *9th IFAC Workshop on Time Delay Systems, Time Delay Systems*, vol. 9, Part 1, (2010), 6 pgs.

"European Application Serial No. 11182649.1, Extended Search Report mailed Feb. 24, 2012", 9 pgs.

"European Application Serial No. 11182649.1, Response filed Jun. 27, 2012 to Office Action mailed Feb. 24, 2012", 9 pgs.

Kogel, Markus J, et al., "Optimal Control over Unreliable Networks with Uncertain Loss Rates", American Control Conference, IEEE, (Jun. 30, 2010), 3672-3677.

Lincoln, Bo, "Jitter Compensation in Digital Control Systems", Proceedings of the 2002 American Control Conference vol. 4, (May 2002), 2985-2990.

Nilsson, Johan, "Real-Time Control Systems with Delays", (1998), 141 pgs.

Yang, Can, et al., "Application of generalized predictive control in networked control system", Journal of Zhejiang University Science A; An International Applied Physics & Engineering Journal 7(2), (Feb. 1, 2006), 225-233.

"Australian Application Serial No. 2012216747, Examination Report No. 1 mailed May 27, 2014", 3 pgs.

"Australian Application Serial No. 2012216747, Response filed Sep. 19, 2014 to Examination Report No. 1 mailed May 27, 2014", 25 pgs.

"Australian Application Serial No. 2012216747, Response filed Jan. 20, 2015 to Examination Report No. 2 mailed Oct. 13, 2014", 12 pgs.

* cited by examiner

CONTROL THAT ESTIMATES DELAYED MANIPULATED VARIABLES

CROSS-REFERENCE TO RELATED APPLICATION

This application claims the benefit of priority under 35 U.S.C. Section 119 to European Patent Application Serial No. 11182649.1, filed on Sep. 23, 2011, which application is incorporated herein by reference in its entirety.

BACKGROUND

Wireless sensor technology allows easy deployment of sensors/actuators and may be more flexible than the classical technology. On the other hand, wireless networks lack reliability and are subject to data loss and random packet delay. This can lead to difficulty in controlling processes over a wireless network. Variables that are set by a control system to control actuators and other devices used to perform the processes may be delayed or lost, and may not control the actuators at the time expected by the controller. This can make it difficult to control the processes in the manner desired.

SUMMARY

A device and method calculates and sends a manipulated variable via a network to control an actuator in a process. If this variable is received in time, it is immediately applied. However, it may be subject to random delays or may be lost. The actuator then uses an appropriate back-up strategy. In the mean time, the controller is not aware, which value was actually applied to the process. Therefore, the value which was actually applied is sent back, to the controller site, again over an unreliable communication link. The estimator then estimates the currently applied actuator input. The estimator can use the locally stored history of sent actuator inputs together with a simple network delay distribution model for an initial estimate. Then, the actuator input estimate is refined using available process data. Using a difference between the calculated manipulated variable and the estimated applied signal, a next calculated manipulated variable is corrected prior to sending the next calculated manipulated variable to the actuator.

In one embodiment, instructions to cause a computer to implement the method are stored on a computer readable storage device.

In a further embodiment, a device includes a controller to calculate a manipulated variable value for an actuator in a process. An estimator receives a (possibly delayed) manipulated variable value applied by the actuator (or alternatively, information based on which the estimator can reconstruct it exactly from the history of actuator commands sent from the controller to the actuator), including a time stamp, to estimate a signal applied by the actuator. A delay compensator is coupled to the estimator and controller to modify the calculated manipulated variable based on the difference between the computed (uncorrected) manipulated variable and the estimate of the actuator input. The estimator further receives process variables—measurement data—that may be sent over the network subject to delays/losses. It is assumed that these are transmitted over a parallel communication channels and that the data losses—delays are of different patterns. In addition to estimating the actuator input, the estimator also estimates a process state that may be used for computing the manipulated variable, as is common in process control.

DETAILED DESCRIPTION

Figure 1:
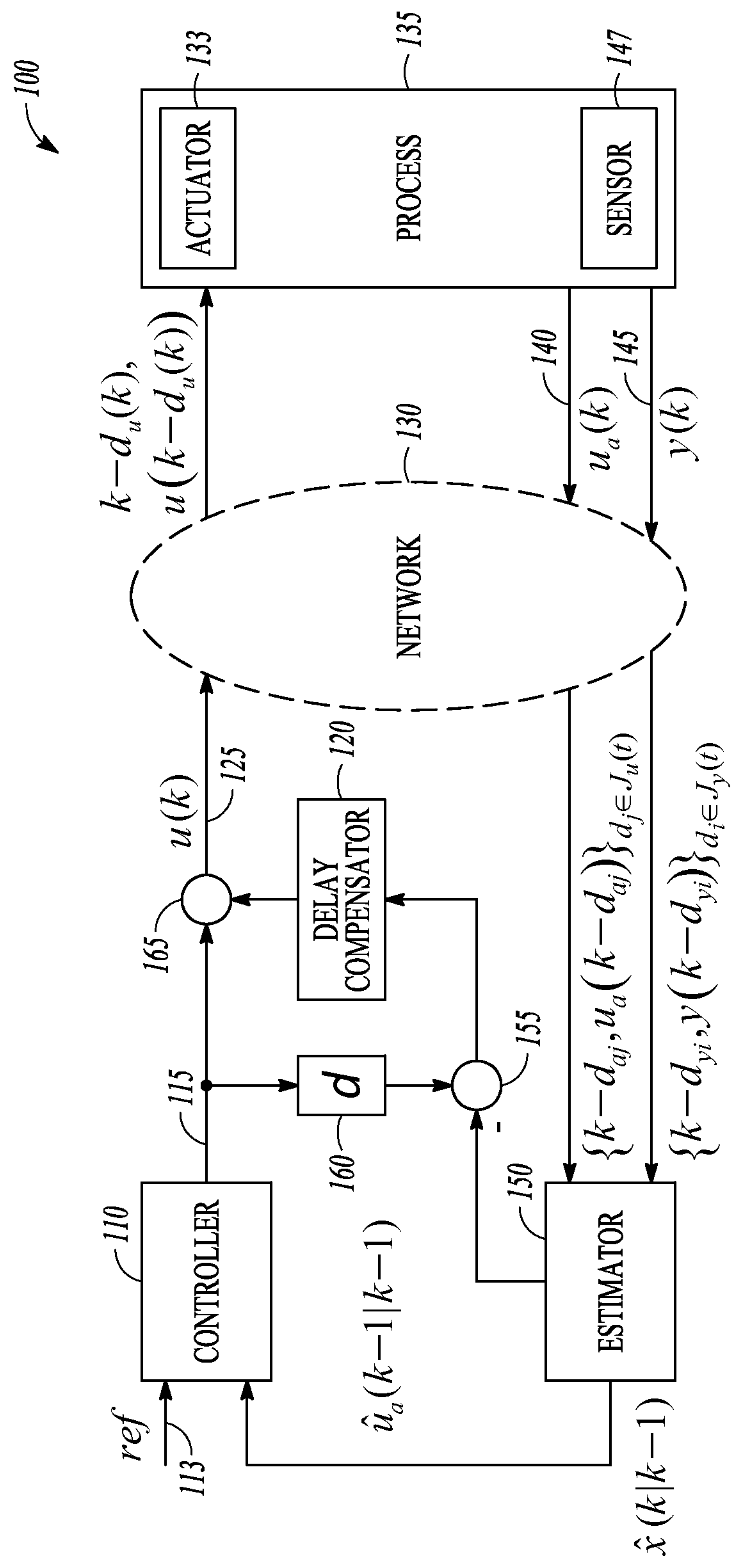
FIG. 1 is a block diagram of a controller configuration for compensating for network delays with respect to actuator commands according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Kalman Filtering is an optimal filtering technique commonly utilized for estimating the state variables of a system. Kalman filtering is a time domain operation that is suitable for use in estimating the state variables of time-varying systems that can be described by a set of differential equations with time-varying coefficients. Kalman filtering approaches can be utilized for estimating unknown inputs of specific classes by augmenting the process model by an appropriate input generator.

A Kalman filter is used for systems with network delays using an approach to out-of-sequence measurements in feedback control systems. Sensor data are transmitted over the network together with a time stamp. Given the assumption that a measurement sample reaches an estimator within a maximum delay, a version of an optimal Kalman filter can be implemented as a switched linear system with Kalman gain being a function of the set of missed samples.

The Kalman filter provides an estimate of the un-delayed process state for the controller, which certainly contributes to process stability and performance. The Kalman filter is able, using an appropriate input model, to estimate the process input. This input estimation is used in the case when the manipulated variable is transmitted, from the controller node to the actuator node over the wireless network. Due to the uncertainty of the communication channel, the Kalman filter may not know whether manipulated variable (MV) produced by the controller reached the actuator on time or with which delay. The actuator node can send the acknowledgement of receiving manipulated variable back, but this message is subject to network delay as well. Hence, the value of the manipulated variable actually applied to the controller can be treated by the Kalman filter as a measurement.

Various embodiments described herein are designed to improve controller performance in the case when manipulated variables are sent to the actuator over the wireless network with uncertain communication delay. A controller utilizes an estimation of the actuator input applied in a previous time step to compensate, to some extent, for delayed actuator commands.

In one embodiment, a feedback correction term (delay compensator) is added, driven by a difference between the estimate of the actuator input applied in the previous time step estimated by the Kalman filter and, a one-step delayed 'tentative manipulated variable'—output of the controller without delay compensation, designed for wired connections with the process. This difference is processed by a correction block that can be a static gain, a simple dynamical compensator of a proportional/derivative (PD) or proportional/integral/derivative (PID) type or a dynamic compensator of a general structure designed, for instance, by robust control design methods, e.g. H-infinity design. Alternatively, the correction block can be time-varying (e.g., scheduled by the delay detected from the acknowledgement signal). Note however, that this strategy may not work satisfactorily if there are intervals of long delays that can be compared to the plant response time. On the other hand, for short and scarce delay the performance can be improved using a static compensator.

FIG. 1 is an illustration of a controller configuration at 100. A controller 110 such as a programmed computer receives a reference value at 113. The controller provides an output 115 referred to as a the tentative manipulated variable, that is modified by a delay compensator 120 to provide a manipulated variable value u(k) at 125 to be sent over a wireless network 130 to an actuator 133. For example, u(k), represents a control input, such as a controller manipulated variable provided to the actuator 133 operating on a process 135. Since the time at which the actuator 133 actually receives the manipulated variable value may be delayed, the process returns value $u_a(k)$ 140 with a time stamp corresponding to when it was received at via network 130 and what value was actually applied. The time stamp corresponds to a discrete time k. Notice that $u_a(k)=u(k-d_u(k))$, where $d_u(k)$ the communication delay in the actuator channel. Hence, assuming that the estimator has an access to the history of u(k), $d_u(k)$, may be transmitted instead of $u_a(k)$. At time k, an estimator 150 receives $u_a(k-d_a(k))$.

There are several strategies of handling situations when no data is received at the actuator side. A straightforward way is to hold the latest received value; if a value arrives that is actually older than that actually applied, it is discarded. On the other hand, a Kalman filter in the estimator 150 can handle situations of data not received. If properly augmented by a chain of delay blocks, the Kalman filter can optimally handle delayed data arriving possibly out-of-sequence, provided the delay does not exceed the length of the delay blocks chain.

In addition to the configuration 100 in FIG. 1, the Kalman filter may receive variable u(k), record locally its history, and, using a statistical distribution of network delays, use it for an initial crude estimate of $u_a(k)$, that is later refined by the Kalman filter using received process data.

A measured variable y(k) 145 may be measured by a sensor 147 sensing some parameter of the process that is being controlled, is also returned via network 130. y(k) corresponds to a measurement of the process that may be affected by the manipulated variable controlled actuator 133. The estimator 150 receives the values from process 135 and using a Kalman filter, provides a vector $\hat{x}(k|k-1)$) (process state prediction from the last time step) to the controller which determines an appropriate control action. The estimator 150 correctly fuses the sensor data and actuator values arriving late, within a priori set maximum delay. The estimator 150 provides a vector $\hat{u}_a(k-1|k-1)$ to a summing node 155, where it is subtracted from the tentative manipulated variable delayed by one time step in delay block d 160. Summing node 155 provides an input to delay compensator 120, which in turn adds a correction term to the controller output creating variable u(k) at 125, to be sent over wireless network 130 to actuator 133.

In one embodiment, a feedback correction term provided by delay compensator 120 is driven by a difference between the output of controller 110 from the previous step and its estimate by the Kalman filter—estimator 150, that is made at node 155. The manipulated variable value is computed by the controller. This difference is processed by correction block 120 that can be a static gain, a simple dynamical compensator of a proportional/derivative (PD) or proportional/integral/derivative (PID) type or a dynamic compensator of a general structure designed, for instance, by robust control design methods, e.g. H-infinity design. Alternatively, it can be time-varying (e.g., scheduled by the delay detected from the acknowledgement signal). A correction term computed by the delay compensator is added to the tentative manipulated variable 115 at node 165 to obtain manipulated variable 125 to be sent, via the network, to the actuator. This compensation may resemble sensitivity recovery techniques developed to enhance robustness to a general type of process model uncertainty. The approach described herein targets particularly uncertainties in communication delay and assumes a particular structure of Kalman filter. In one embodiment, the approach is extended by the unknown input model as well as by a model of variable network delays (chains of delay blocks).

Figure 2:
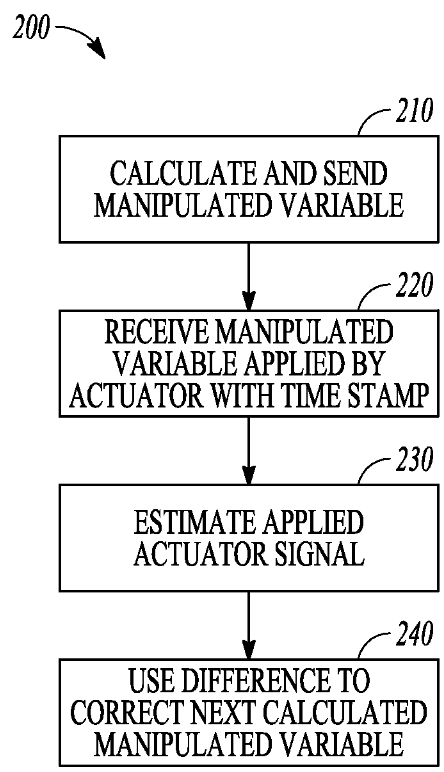
FIG. 2 is a flowchart illustrating a method of compensating for network delays according to an example embodiment.

FIG. 2 is a flowchart illustrating an example method 200 of taking network delays into account when providing a manipulated variable to an actuator operating on a process. Method 200 includes calculating and sending a manipulated variable via a network to control an actuator in a process at 210. At 220, an indication identifying when the sent manipulated variable was applied by the actuator is received from the network. The method then estimates an applied actuator signal at 230, and, at 240 using a difference between the calculated manipulated variable and the estimated applied signal to correct a next calculated manipulated variable prior to sending the next calculated manipulated variable to the actuator.

In various embodiments, the correction may be a static gain, a dynamic proportional/derivative gain, a dynamic proportional/integral/derivative gain, or may be general dynamical system, possibly time varying.

Figure 3:
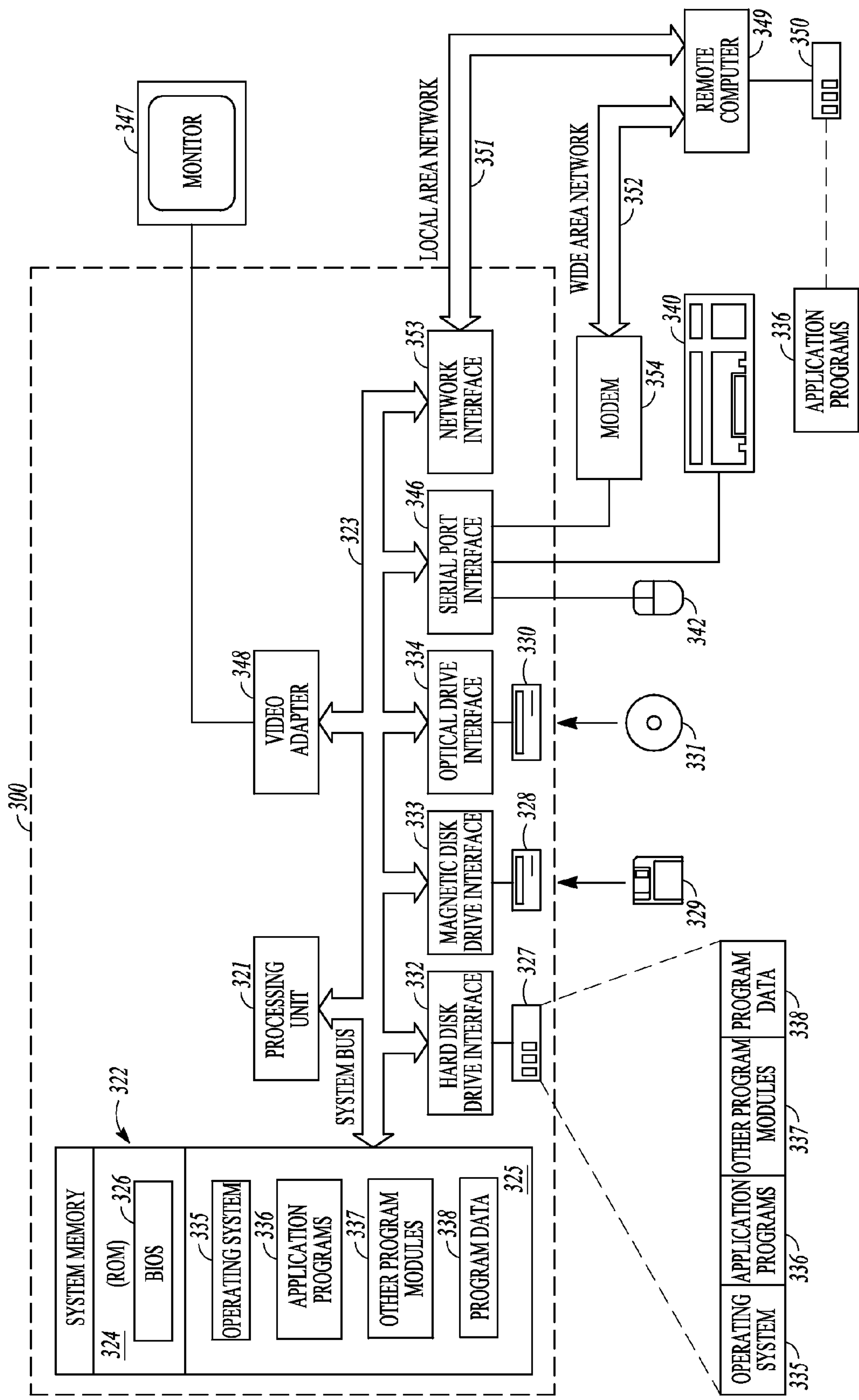
FIG. 3 is a block diagram of a computer system for use in executing methods according to an example embodiment.

FIG. 3 is a block diagram of a computer system to implement methods according to an example embodiment. In the embodiment shown in FIG. 3, a hardware and operating environment is provided that is applicable to any of the devices of FIG. 1, such as the controller 110 and estimator 150.

As shown in FIG. 3, one embodiment of the hardware and operating environment includes a general purpose computing device in the form of a computer 300 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 300 comprises a single central-processing unit (CPU), or a plurality of processing units, commonly referred to as a multiprocessor or parallel-processor environment. In various embodiments, computer 300 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 300, such as during start-up, may be stored in ROM 324. The computer 300 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein may be resident on any one or number of these computer-readable media.

A user may enter commands and information into computer 300 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user. In addition to the monitor 347, computers typically include other peripheral output devices (not shown), such as speakers and printers.

The computer 300 may operate in a networked environment using logical connections to one or more remote computers or servers, such as remote computer 349. These logical connections are achieved by a communication device coupled to or a part of the computer 300; the invention is not limited to a particular type of communications device. The remote computer 349 can be another computer, a server, a router, a network PC, a client, a peer device or other common network node, and typically includes many or all of the elements described above 110 relative to the computer 300, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WAN-networking environment, the computer 300 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 300 can be stored in the remote memory storage device 350 of remote computer, or server 349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:

calculating and sending, via a controller, a manipulated variable via a possibly unreliable network to control an actuator in a process;

receiving information at the controller identifying a value which was actually applied by the actuator together with a time stamp indicating a time of applying the value;

receiving process data at the controller representative of a process state, the process data acquired by sensors over the network together with the time stamp indicating the time when the acquisition took place;

estimating an applied actuator input signal via the controller along with the process state, fusing received process data acquired by sensors and received information identify the value which was actually applied by the actuator arriving late within a set maximum delay; and using a difference between the calculated manipulated variable and the estimated applied actuator input signal to correct, via an estimator, a next calculated manipulated variable determined by the controller prior to sending the next calculated manipulated variable to the actuator;

wherein a correction signal is added to the controller output which is a difference between the calculated manipulated variable and the estimated applied signal.

2. The method of claim 1 wherein a correction is a signal added to the controller output which is a difference between the calculated manipulated variable and the estimated applied signal from the last time step subject to a static gain.

3. The method of claim 1 wherein a correction is a signal added to the controller output which is a difference between the calculated manipulated variable and the estimated applied signal from the last time step passed a dynamic proportional/derivative block.

4. The method of claim 1 wherein a correction is a signal added to the controller output which is a difference between the calculated manipulated variable and the estimated applied signal from the last time step passed to a dynamic proportional/integral/derivative block of the controller.

5. The method of claim 1 wherein a correction is signal added to the controller output which is a difference between the calculated manipulated variable and the estimated applied signal from the last time step passed through a time varying dynamical system of general structure.

6. A non-transitory computer readable storage device transitory signal having instructions for causing a computer to implement a method, the method comprising:

calculating and sending, via a controller, a manipulated variable via a network to control an actuator in a process;

receiving information at the controller identifying a value which was actually applied by the actuator together with a time stamp indicating a time of applying a signal;

receiving process data at the controller representative of a process state, the process data acquired by sensors over the network together with the time stamp indicating the time when acquisition took place;

estimating at the controller an applied actuator input signal along with the process state, fusing received process data acquired by sensors and received information identify the value which was actually applied by the actuator arriving late within a set maximum delay; and using a difference between the calculated manipulated variable and the estimated applied signal to correct a next calculated manipulated variable prior to sending the next calculated manipulated variable to the actuator via the controller;

wherein a correction signal is added to the controller output which is a difference between the calculated manipulated variable and the estimated applied signal.

7. The computer readable storage device of claim 6 wherein a correction is at least one of a static gain, a controller dynamic proportional/derivative block gain, and a controller dynamic proportional/integral/derivative block gain.

8. The computer readable storage device of claim 6 wherein a correction is varying dynamical system of general structure, time invariant or time varying.

9. The computer readable storage device of claim 6 wherein a correction is a signal added to the controller output which is a difference between the calculated manipulated variable and the estimated applied signal from the last time step subject to a static gain.

10. The computer readable storage device of claim 6 wherein a correction is a signal added to the controller output which is a difference between the calculated manipulated variable and the estimated applied signal from the last time step passed a dynamic proportional/derivative block.

11. The computer readable storage device of claim 6 where in a correction is a signal added to the controller output which is a difference between the calculated manipulated variable and the estimated applied signal from the last time step passed a dynamic proportional/integral/derivative block.

12. The computer readable storage device of claim 6 wherein a correction is signal added to the controller output which is a difference between the calculated manipulated variable and the estimated applied signal from the last time step passed through a dynamical system of general structure, possibly time varying.

13. A device comprising:

a programmed hardware controller to calculate a manipulated variable value for an actuator in a process;

an estimator to receive a manipulated variable value applied by the actuator, including a time stamp indicating a time of applying the actual manipulated variable value, to estimate a signal applied by the actuator, and to provide a delay via a feedback correction term to compensate for network delays in communications between the controller and the actuator, wherein the feedback correction term is driven by a difference between an estimate of actuator input applied in a previous time step estimated by a Kalman filter and a one-step delayed tentative manipulated variable, wherein the one-step delayed tentative manipulated variable comprises output of the controller without delay compensation, wherein the estimator uses a locally stored history of sent actuator inputs and a network delay distribution model to initially estimate actuator input and wherein a delay compensator is coupled to the estimator and the controller to modify the manipulated variable value based on a difference between the manipulated variable value and the estimated signal applied by the actuator; and a delay compensator coupled to the estimator and controller to modify the calculated manipulated variable responsive to the difference between the estimated actuator input signal provided by the estimator and the manipulated variable computed by the controller.

14. The device of claim 13 wherein the estimator comprises a Kalman filter.

15. The device of claim 14 where the Kalman filter provides an estimate of an un-delayed process state to the controller, fuses delayed sensor and actuator data received within a set maximum delay, and provides an estimate of the actuator input signal to the delay compensator.

16. The device of claim 13 wherein the delay compensator is driven by a difference between the estimate of the signal applied by the actuator and the manipulated variable value calculated by the controller.

17. The device of claim 16 wherein the correction is at least one of a static gain, a dynamic proportional/derivative block, a controller dynamic proportional/derivative block gain, and a controller dynamic proportional/integral/derivative block gain of general structure.

* * * * *